(12) United States Patent
Pfeilschifter et al.

(10) Patent No.: US 10,953,751 B2
(45) Date of Patent: Mar. 23, 2021

(54) VEHICLE-SIDE POWER CIRCUIT FOR SUPPLYING POWER IN AN ELECTRICALLY DRIVEN VEHICLE

(71) Applicant: CONTINENTAL AUTOMOTIVE GMBH, Hannover (DE)

(72) Inventors: Franz Pfeilschifter, Alte Nürnberger (DE); Martin Brüll, Barbing (DE); Wilhelm Hackmann, Berlin (DE); Klaus Mühlbauer, Friedenfels (DE); Martin Spornraft, Rottenburg (DE); Matthias Töns, Regensburg (DE)

(73) Assignee: Vitesco Technologies GmbH, Hannover (DE)

( * ) Notice: Subject to any disclaimer, the term of this patent is extended or adjusted under 35 U.S.C. 154(b) by 151 days.

(21) Appl. No.: 15/933,876

(22) Filed: Mar. 23, 2018

(65) Prior Publication Data

US 2018/0215268 A1  Aug. 2, 2018

Related U.S. Application Data

(63) Continuation of application No. PCT/EP2016/070827, filed on Sep. 5, 2016.

(30) Foreign Application Priority Data

Sep. 24, 2015 (DE) .................. 10 2015 218 416

(51) Int. Cl.
*B60L 1/00* (2006.01)
*B60L 53/24* (2019.01)
(Continued)

(52) U.S. Cl.
CPC .............. *B60L 1/00* (2013.01); *B60L 15/025* (2013.01); *B60L 50/40* (2019.02); *B60L 53/24* (2019.02);
(Continued)

(58) Field of Classification Search
CPC .. B60L 1/00; B60L 53/24; B60L 50/40; B60L 15/025; B60L 53/18; B60L 53/16;
(Continued)

(56) References Cited

U.S. PATENT DOCUMENTS 5,091,839 A * 2/1992 Gaul ..................... H02M 7/527
363/41
7,957,166 B2 * 6/2011 Schnetzka ............. H02M 7/003
363/56.03
(Continued)

FOREIGN PATENT DOCUMENTS

CN  104245396 A  12/2014
CN  104512274 A  4/2015
(Continued)

OTHER PUBLICATIONS

International Search Report and Written Opinion dated Dec. 12, 2016 from corresponding International Patent Application No. PCT/EP2016/070827.
(Continued)

*Primary Examiner* — Rexford N Barnie
*Assistant Examiner* — Swarna N Chowdhuri

(57) ABSTRACT

A vehicle-side circuit for supplying power in an electrically driven vehicle is provided. The power circuit includes an external AC voltage terminal; at least one DC/AC converter having an AC voltage side; and an electrical machine having a plurality of windings, each of which has a first tapping. The electrical machine is connected to the AC voltage side of the DC/AC converter. A switching device is connected to the plurality of windings and to a signal shaping filter having a plurality of first capacitors. The signal shaping filter is connected between the DC/AC converter and an external AC terminal. The switching device may interconnect the windings within the electrical machine or may connect the first tappings of the plurality of windings within the signal
(Continued)

shaping filter to the plurality of first capacitors to form an at least third-order low-pass filter.

13 Claims, 2 Drawing Sheets

(51) Int. Cl.
*B60L 50/40* (2019.01)
*B60L 15/02* (2006.01)
*H02M 1/12* (2006.01)
*H02M 1/44* (2007.01)
*H02M 7/66* (2006.01)

(52) U.S. Cl.
CPC ............ *H02M 1/126* (2013.01); *H02M 1/44* (2013.01); *B60L 2210/30* (2013.01); *B60L 2210/42* (2013.01); *H02M 7/66* (2013.01); *Y02T 10/70* (2013.01); *Y02T 10/7072* (2013.01); *Y02T 90/12* (2013.01); *Y02T 90/14* (2013.01)

(58) Field of Classification Search
CPC ......... H02M 1/126; H02M 1/44; Y02T 90/12; Y02T 90/14
USPC .................................................... 307/10.1, 9
See application file for complete search history.

(56) References Cited

U.S. PATENT DOCUMENTS

| | | | |
|---|---|---|---|
| 8,415,904 B2* | 4/2013 | Rippel | H02P 6/14 318/139 |
| 2010/0280777 A1* | 11/2010 | Jin | B60L 3/0046 702/63 |
| 2011/0062778 A1* | 3/2011 | Holweck | H02P 3/22 307/9.1 |
| 2011/0316461 A1* | 12/2011 | Rippel | H02P 6/14 318/400.29 |
| 2012/0049770 A1* | 3/2012 | Bouchez | B60L 50/51 318/139 |
| 2014/0265947 A1 | 9/2014 | Hsu | |
| 2015/0054434 A1 | 2/2015 | Bruyere | |
| 2015/0097426 A1 | 4/2015 | Yamane et al. | |
| 2016/0114686 A1* | 4/2016 | Beattie, Jr. | B60L 11/182 320/108 |
| 2016/0368390 A1* | 12/2016 | Yang | B60L 11/1818 |

FOREIGN PATENT DOCUMENTS

| | | |
|---|---|---|
| EP | 2407339 A1 | 1/2012 |
| JP | 2013531461 A | 6/2010 |
| JP | 2012070612 A | 4/2012 |
| JP | 2012085510 A | 4/2012 |
| JP | 2012100459 A | 5/2012 |
| WO | 2011151131 A1 | 12/2011 |
| WO | 2014206373 A1 | 12/2014 |

OTHER PUBLICATIONS

German Office Action dated Oct. 6, 2016 for corresponding German Patent Application No. 10 2015 218 416.1.

Japan Office Action dated Apr. 17, 2019 for corresponding Japan Patent Application No. 2018-515448.

* cited by examiner

VEHICLE-SIDE POWER CIRCUIT FOR SUPPLYING POWER IN AN ELECTRICALLY DRIVEN VEHICLE

CROSS-REFERENCE TO RELATED APPLICATIONS

This application claims the benefit of PCT Application PCT/EP2016/070827, filed Sep. 5, 2016, which claims priority to German Application DE 10 2015 218 416.1, filed Sep. 24, 2015. The disclosures of the above applications are incorporated herein by reference.

TECHNICAL FIELD

The disclosure relates to the field of hybrid vehicles and electric vehicles, in particular a power supply within said vehicles.

BACKGROUND

Firstly, a power supply in an electrically driven vehicle (i.e., a vehicle driven purely electrically or in a hybrid manner) must ensure the power supply of an electrical machine for driving the vehicle, and, secondly, the possibility of charging the vehicle from external electrical energy sources must be possible. It is generally known that inverters are used in such vehicles in order to convert electrical energy from an electrical energy store into a rotary magnetic field by the electrical machine of the vehicle. Furthermore, power converters are known which ensure that electrical energy is exchanged between vehicle and external supply network, whether for charging or else for feeding energy back from the vehicle into the supply network.

Since a DC energy store (in the form of a rechargeable battery or a capacitor) is used on the vehicle side and supply networks usually use AC voltage, high-frequency interference components occur during the process of conversion between alternating current and direct current. It is furthermore generally known that such interference components are filtered out by an EMC filter (EMC stands for electromagnetic compatibility), which in principle are embodied as a low-pass filter.

The document U.S. Pat. No. 8,415,904 B2 describes an electric motor whose windings can be connected to capacitors in a switchable manner to form an LC filter, in order to implement a first filter followed by an EMC filter followed by an AC terminal.

The filter effect of the LC filter thus formed is not completely satisfactory and the downstream EMC filter has to be configured with a high filter effect.

The power circuit described here represents a possibility as to how this can be at least partly improved.

SUMMARY

A vehicle-side power circuit is described in which the windings of the electrical machine (of the traction drive of the vehicle or of some other electrical machine in the vehicle, for instance electrical air-conditioning compressor), besides the function in the context of the electrical machine, are used to form a higher-order filter by tappings. The EMC filter forms an at least third-order low-pass filter, such that together with at least one further filter component, for example, a capacitor, the windings of at least two inductance components (divided by first tappings) form an at least third-order filter. As a result, interference components are effectively filtered out by the windings of the electrical machine and, for example, signal shaping is realized.

At the same time, by using the windings of the electrical machine that are provided with tappings in the filter (in addition to at least one further filter component) it is possible to reduce the number of electrical components needed for realizing a network filter. In particular, with appropriate configuration it is possible to dispense with an EMC filter connected downstream.

The vehicle-side power circuit described here for supplying power in an electrically driven vehicle includes an external AC voltage terminal. The latter serves as a plug-in terminal in order to connect the vehicle to an external supply network via a cable, for instance, in order to exchange energy between vehicle and supply network. In principle, wired embodiments are suitable as AC voltage terminal, but it is also possible to use an inductive charging unit and the external AC voltage terminal is not designed as a cable, but rather as a magnetically coupled coil pair (a vehicle-side coil and a stationary coil).

The power circuit has at least one DC/AC converter. The latter is configured at least as an inverter (i.e. realizes at least the function as an inverter) and is thus configured to convert direct current DC into alternating current AC (for generating the rotary magnetic field in the electrical machine and/or for feeding electrical energy back from the vehicle into an external supply network). The DC/AC converter may be a converter having a rectification function (with or without voltage level matching), in order to convert electrical energy from alternating current into direct current for the purpose of transmitting energy from the external AC voltage terminal to a vehicle-side energy store.

The DC/AC converter is connected such that a vehicle-side electrical energy store is connected to the AC voltage side directly or indirectly via a DC/DC converter needed, for instance, for voltage level matching or for charging current control. In the inverter function, too, a further DC/DC converter is provided between the electrical energy store and the electrical machine, for example, for power control of the electrical machine or for voltage level matching. The DC/AC converter is equipped as a controllable full-wave bridge, for example, as a B6C bridge. The DC/AC converter may have a B6C bridge. The DC/AC converter may also be configured in a bipartite fashion.

The power circuit furthermore includes an electrical machine, such as a traction drive or for driving ancillary units (for instance as an electrically operated air-conditioning compressor). The electrical machine has at least one winding, where the electrical machine may have a plurality of windings, for example windings equipped in an identical way, which are switched symmetrically, for example. In some example, the electrical machine includes a plurality of individual windings used as phase windings to generate a rotary field. The electrical machine may be a synchronous machine, where the at least one first winding is at least one phase winding of the stator winding. The term stator winding denotes the totality of all the individual windings or phase windings that the electrical machine has. The electrical machine is connected to the AC voltage side of the DC/AC converter.

In some implementations, the power circuit is configured with a switching device connected to the at least one winding.

The power circuit may furthermore include a signal shaping filter having a plurality of first capacitors. The capacitors may be discrete components or jointly as one discrete component and may not be part of the electrical machine. The signal shaping filter is connected between the DC/AC converter (or the AC voltage side thereof) and the external AC terminal. The external AC terminal is fitted on the vehicle side, for example, on an outer shell of the vehicle, and serves for linking the vehicle to external supply networks. In order to express this purpose, the prefix "external" is used, the prefix describing only the purpose of the terminal, but not the location of the terminal.

In some implementations, the switching device connects the plurality of windings within the signal shaping filter to the capacitor to form a low-pass filter. Here, "within" means that the windings here are functionally assigned to the signal shaping filter and form part of the filter. In this context, the windings are assigned to the signal shaping filter. The indication "within" should not be understood as an indication of the location at which the connection is produced, rather the connection is produced within the switching device.

In some examples, the low-pass filter is an at least third-order filter and thus includes the windings or their sections formed by the tappings as inductances and also the first capacitors. These two filter components are connected in such a way as to yield a third-order low-pass filter. The term at least third-order low-pass filter denotes, for example, filters which have a low-pass filter behavior and whose transfer function bears an at least third-, fourth- or higher-order polynomial in the denominator. In accordance with a comparable definition the damping of the low-pass filter increases above a cut-off frequency of the low-pass filter with at least 60 dB/decade.

In some implementations, low-pass filters which correspond to a T filter, an LC filter with downstream series inductance, an LC filter having two or more than two stages or a T filter having one or a plurality of stages of LC and/or T filters or include a corresponding filter circuit are suitable as third-order low-pass filter. It is possible, as mentioned, to combine a plurality of identical or different filter types of this kind in the low-pass filter in the sense of the multi-stage configuration mentioned, for example in order to achieve a stronger damping effect at high frequencies or in order to increase the edge steepness of the filter.

Each of the windings has a first tapping or a first tapping and at least one second or further tapping. The windings are thereby subdivided into sections. The sections each form an inductance in the signal shaping filter or an (individual) series path of the LC filter, T filter or a filter having one or a plurality of LC filter stages and/or at least one or a plurality of T filter stages. In the case of a plurality of filter stages, the latter are cascaded. In some examples, a respective capacitor is connected to each of the tappings and/or to one or to both ends of the windings, to form the capacitance component of a T filter, an LC filter, a T filter stage or an LC filter stage. Each section of the windings contributes to increasing the order of the filter. Each capacitor contributes to increasing the order of the filter. The windings or the sections thereof form a series path of the signal shaping filter.

The switching device is connected to optionally interconnect the first tapping (and if appropriate further tappings) of the windings with the first capacitors to form a low-pass filter, or at least to interconnect the windings within the electrical machine (i.e. the ends of one side of the windings). In some examples, the interconnection of the windings of the electrical machine yields a three-phase stator winding of the electrical machine that is configured to generate a rotary field within the electrical machine, for example in order to operate the electrical machine as an electrical motor or as an electrical generator. The windings are connected at the star point, for example, by the switching device. Depending on the switching state of the switching device, therefore, the star point is terminated (namely if the tappings are connected to the capacitors) or the windings are interconnected to form the star point (namely if the capacitors are disconnected from the tappings). The interconnection of the windings yields a star configuration for the electrical machine. In this case, the windings include for example a total of three or more (e.g., an integral multiple of three) windings.

In some examples, the windings of the electrical machine are switched symmetrically with respect to one another. This also applies to the first (and/or second or further) tappings and to the first (and/or second or further) capacitors.

In some implementations, as mentioned, the DC/AC converter is designed in a bipartite fashion, for example by two (partly or completely controllable) bridges, such as B6C bridges, where the windings are connected between these two bridges, for example in order to enable a higher operating voltage for the electrical machine. The term used here "AC voltage side", to which the windings are connected, concerns the AC voltage side of that bridge which is opposite to the external AC voltage terminal. A (single-phase or polyphaser) bridge disconnecting switch for the other bridge (which is connected to the external AC voltage terminal) may be provided. The bridge disconnecting switch may be open if the power circuit is in the filter state, and may be closed if the power circuit is in the machine mode.

In some examples, the switching device has at least one changeover switch, via which the at least one first winding is connected to the at least one first capacitor or to the at least one second winding of the electrical machine. In the first-mentioned case, the changeover switch has a position in which the windings operate within the signal shaping filter ("filter state") and are thus connected to the capacitors. In the second position, the changeover switch connects the windings in such a way that a three-phase winding results ("machine state"). For example, this results in a polyphase stator winding or a winding order configured for generating a rotary magnetic field.

Furthermore, the switching device may have capacitor disconnecting switches. The latter can be part of the changeover switch. Via the capacitor disconnecting switches, the capacitors are connected to the tappings or ends of windings. For simplification, the term "tappings" herein is intended to denote the tappings between the ends of the windings, and also stand for the ends of the windings. The capacitor disconnecting switch is connected in series with the capacitor, for example, such that the capacitor as necessary, i.e. if the windings are intended to operate within the signal shaping filter as a filter component ("filter state"), connects the capacitors to the windings and otherwise disconnects the capacitors, for example if the windings operate within the electrical machine ("machine state").

The changeover switches or the capacitor disconnecting switches may be symmetrical or form a polyphase switching unit, such that the term switch (changeover switch or disconnecting switch) does not necessarily denote just an individual switching element, but also a group of switching elements that are provided in a three-phase system.

Furthermore, the switching device may have at least one star-point disconnecting switch. The latter may be part of the changeover switch. Via the star-point disconnecting switch, the windings of the electrical machine are connected to one another. The star-point disconnecting switches, too, may be configured as a polyphase switching unit, for example symmetrically with respect to the star point of the electrical machine, at which ends of all windings meet if the electrical machine is operated as such.

In some implementations, the windings or their sections and the capacitors form a T filter. The capacitors are situated in the shunt path of the T filter. The two series paths of the T filter, which extend away from the shunt path, are formed by the sections of the windings which extend away from the tapping.

Therefore, two sections of the windings together with the capacitors or the at least one first winding and at least one second winding of the electrical machine together with the capacitors form a T filter. The capacitors are situated in the shunt path of the T filter. The two sections of the at least one winding form the two series paths of the filter. The windings may be provided at different locations of the electrical machine, for example at different angular positions. This also applies to the sections.

It should be noted that the function "for generating a rotary magnetic field" is simplified and merely represents motor operation of the electrical machine; generally, the function of the winding within the electrical machine both as motor and as generator is designated thereby.

The ends of one side of the windings are connected to the AC voltage side of the DC/AC converter, where the capacitors are connected to the tappings or to that end of the winding which is opposite to the end which is (directly) connected to the AC side of the DC/AC converter.

Furthermore, in some examples, the DC/AC converter is designed in a bidirectional fashion. Therefore, the DC/AC converter may have a DC side, which serves as input and also as output, while the AC side may also serve as output or input. As a result, it is possible for the DC/AC converter to transmit powers in both directions, for example, in order to enable equally a charging process as well as a feedback from the vehicle into the supply network. As mentioned, the DC/AC converter may be configured as a polyphase, fully or at least partly switchable bridge, such as a B6C bridge. The DC/AC converter may be configured as a full-wave bridge, where both switching elements of a branch are controlled or only one switching element of the branch is controlled (while the other switching element is a diode).

In some examples, suitable switching elements of the DC/AC converter are semiconductor switches, such as transistors or thyristors, for example field effect transistors, e.g., MOSFETs, or else IGBTs. As mentioned, the DC/AC converter can also be designed in a bipartite fashion in order to connect the windings of the electrical machine (in the machine state) between both parts of the DC/AC converter. In the filter state, that part of the DC/AC converter which is connected on the side of the external AC terminal is deactivated or disconnected by a bridge disconnecting switch.

In some implementations, the power circuit has a control unit. The latter is configured to put the switching device optionally into a filter state and into a machine state. For this purpose, the switching device may have an input connected to a control output of the control unit. The control unit itself can also have an input, for instance for connecting a superordinate controller, in order to predefine the state. The control unit may be partly or completely designed as a processor connected to a program memory on which a program for setting and for defining the states is stored. The program in the program memory is designed to be able to be processed by the processor.

The switching device may optionally be put into the filter state or into the machine state by the control unit. In the filter state, the control unit drives the switching device in such a way that the latter connects the windings within the signal shaping filter to the capacitors to form an at least third-order low-pass filter.

In the machine state, the control unit drives the switching device in such a way that the latter connects the windings of the electrical machine to form a three-phase stator winding. The windings of the electrical machine include the at least first winding and the at least second winding. In this case, the windings of the electrical machine are connected to one another in particular at a star point of the three-phase stator winding.

In some implementations, the signal shaping filter is a three-phase fashion. This also applies to the external AC terminal. Moreover, the DC/AC converter is designed as a single-phase or polyphase fashion, for example with a number of phases adapted to the number of phases of the electrical machine. This applies to the AC voltage side of the DC/AC converter; a phase consideration is unnecessary for the DC side of the DC/AC converter. Furthermore, the switches, capacitors and coils mentioned here may be designed as a polyphase unit, where the number of phases thereof corresponds to the number of phases of the signal shaping filter, such as, to the number of phases of the external AC terminal.

The external AC terminal may be designed in accordance with the IEC62196 standard. The external AC terminal may be a plug-in plug connection element, for example according to the aforementioned standard or else in accordance with a further standard. In other words, the external AC terminal may be provided as a standardized plug-in terminal. The external AC terminal is manifested in a three-phase manner and as a plug contact arrangement. In some examples, the external AC terminal is situated on an outer shell of the vehicle, for example in a depression, which may be closed by a flap.

As mentioned, the power circuit may have second or further capacitors. The latter are connected to second or further tappings of the windings in a switchable manner. The first capacitors may form a group or a polyphase unit. The second or further capacitors can likewise form a group, which, however, differs from the group of the first capacitors (for example does not form an intersection therewith).

The location of the tappings within the windings defines the inductance of the sections. Therefore, the lengths of the sections can be configured in accordance with a desired filter effect, for instance the least possible total harmonic distortion for the fundamental, the greatest possible damping of one specific frequency range and/or the least possible passband attenuation for another specific frequency range (containing the fundamental frequency, for example).

The first tappings can subdivide the windings in each case into sections having different inductances. Consequently, the tappings are not necessarily situated in the center of the windings, but rather can also be at a distance from the center. As a result, first sections of the windings together with the capacitors connected thereto can form a filter stage having a first cut-off frequency, and second or further sections of the windings together with the capacitors connected thereto can form a second filter stage having a second cut-off frequency, which deviates from the first cut-off frequency. It is also possible to provide two filter stages having different purposes; a first filter stage for sinusoidal signal shaping and a second filter stage for filtering out a specific interference frequency range (for instance concerning a harmonic of a specific order, the power of which is particularly high).

In some examples, first and, if appropriate, second or further tappings are arranged at the same location of the different windings. The first tapping of a winding is situated at a location that corresponds to the first tapping of a further winding. Here, "location" denotes a position relative to one side or end of the windings, which position can be defined by a distance from one end of the windings (of the same side).

Furthermore, the signal shaping filter can be configured to filter a signal having a fundamental power proportion of at least 75%, 85%, 95% or 98% of the total power from a rectangular wave having a fundamental frequency of 40 Hz-400 Hz and a duty ratio of 50%. This can be achieved by a suitable choice of the filter function and thus of the capacitance values of the capacitors or by a suitable choice of the length of the sections which are defined by the tappings.

Furthermore, in some examples, the capacitors can each have a capacitor disconnecting switch. Via the switch, each of the capacitors is connected to the relevant tapping. The capacitor is therefore switchable. The disconnecting switch is closed in the filter mode in order to derive signal components to be filtered out, and is open in the machine mode so that the electrical machine is not reactively loaded during operation.

The DC/AC converter may be a bidirectional fashion. In some example, the DC/AC converter is a unidirectional fashion, from the DC voltage side toward the AC voltage side.

In some implementations, the power circuit can furthermore have a star-point disconnecting device having star-point disconnecting switches. The ends of the windings of the electrical machine are connectable to one another to form a star point in a switchable manner. The star-point disconnecting device and the capacitor disconnecting switches operate alternatively, such that both types of switch together form a changeover switch from a functional standpoint. From a functional standpoint, the star-point disconnecting device can furthermore be part of a changeover switch which connects the windings to the external AC terminal when the star-point disconnecting device is open.

The power circuit can furthermore have a control unit configured to put the switching device, for example, the capacitor disconnecting switches, and the star-point disconnecting device, or in other words the changeover switches formed thereby, optionally into a filter state and a machine state.

In the filter state, the control unit drives the star-point disconnecting device according to an open switching state and drives the switching device according to a closed switching state. This is achieved by a control signal generated by the control unit and by the configuration of the relevant switches or switching device. This has the consequence that, as a result of these switching states, the windings are connected to the capacitors to form an at least third-order low-pass filter.

In the machine state, the control unit drives the star-point disconnecting device according to a closed switching state and the switching device of the capacitors (i.e. the capacitor disconnecting switches) in according to an open switching state. As a result of the switching states in the machine state, the windings are connected to form a three-phase stator winding.

An EMC filter can be connected upstream of the external AC voltage terminal. The EMC filter connects the windings of the electrical machine to the external AC voltage terminal. The cut-off frequency of the EMC filter lies above a cut-off frequency of the signal shaping filter. Therefore, if the requirements made of the signal quality are particularly stringent, an EMC filter can be connected downstream of the signal shaping filter. As a result, high-frequency components possibly present in the signal originating from the signal shaping filter can be filtered out.

As mentioned, the external AC terminal may be designed according to a standard for electrical coupling of plug-in vehicles, such as the IEC 62196 standard.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
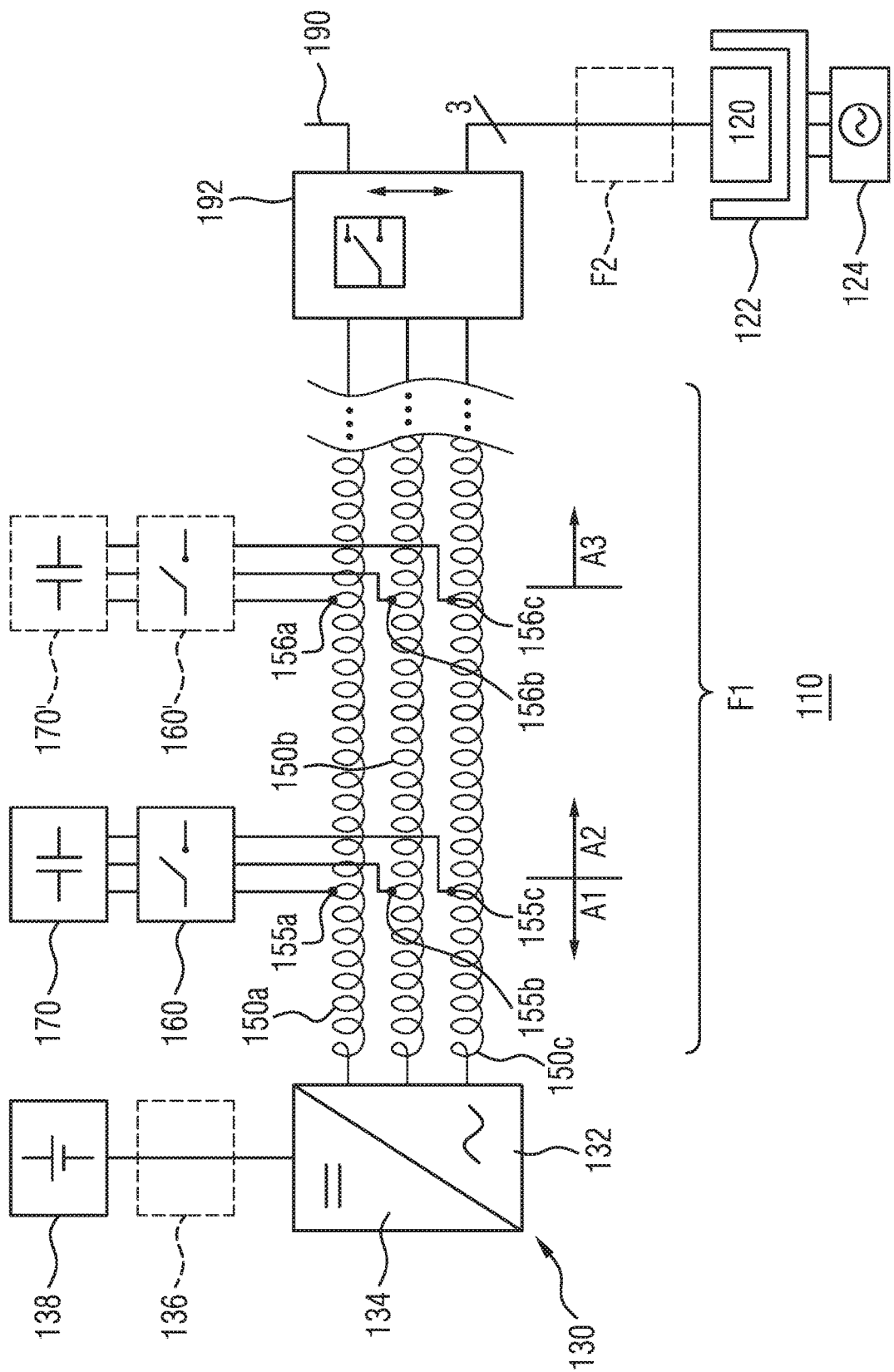
FIGS. 1 and 2 show filter configurations of a power circuit.

FIG. 1 shows a power circuit 110 including an external AC voltage terminal 120 (illustrated symbolically) and including a DC/AC converter 130, which has an AC voltage side 132. Only the windings 150a-150c of an electrical machine 110 are illustrated, which windings together form a stator winding. A switching device 160, 192 is connected to the windings 150a-c.

In FIG. 1, the switching device is illustrated as bipartite and comprises a three-phase changeover switch 192 and a three-phase capacitor disconnecting switch 160. The changeover switch and the capacitor disconnecting switch together form the switching device. Furthermore, an optional further three-phase capacitor disconnecting switch 160' is illustrated, which can likewise be part of the switching device.

The windings have tappings 155a-c, between which, on the one hand, and the AC voltage side, on the other hand, for each winding there is the same inductance (defined by the relevant winding section). The three-phase capacitor disconnecting switch 160 connects the tappings 155a-c to the three-phase capacitor 170 in a switchable manner.

Within the signal shaping filter F1, therefore, the section between the first tappings 155a-c and that end of the windings which joins the AC voltage side 132 forms a (three-phase) inductance. The inductance is in a series path of the filter F1, where the three-phase capacitor 170 is situated in a shunt path when the disconnecting switch 160 is closed. Besides the section A1 between that end of the windings which joins the AC voltage side 132 and the tappings 155a-c, the filter F1 furthermore includes a section A2 of the windings 150a-c. The section A2 may extend from the tappings 155a-c as far as the changeover switch 192. This results in a T filter in which the second series path is formed by the second section A2 of the windings 155a-c.

Furthermore, FIG. 1 illustrates the possibility of second tappings 156a-c existing. The latter would divide up the windings 155a-c into a further section A3 (besides the sections A1 and A2). A capacitor 170' (polyphase) is connected to the second tappings 156a-c, too, via a disconnecting switch 160' (polyphase).

Figure 2:
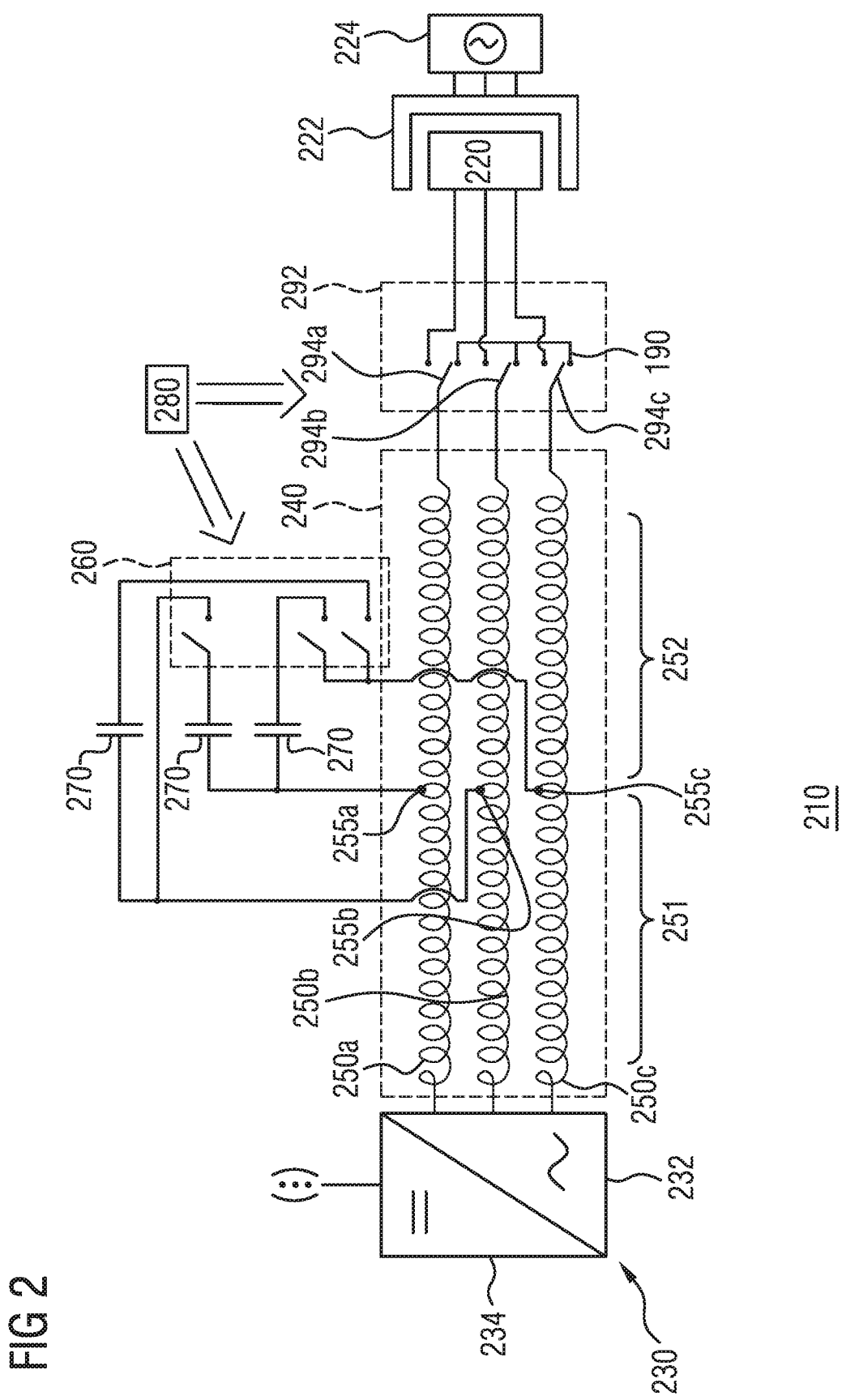

For simplified illustration, the disconnecting switch 160' and the capacitor 170' are illustrated as three-phase; in the case of an actual realization, the three-phase disconnecting switch 160' and the three-phase capacitor 170' can be realized by second capacitor disconnecting switches and second capacitors, respectively, as is illustrated for instance in FIG. 2.

The filter F1 can furthermore have further sections defined by the tappings, where different sections are situated on both sides of the tappings. The tappings separate the winding of the electrical machine into a plurality of individual inductances and furthermore afford the possibility of individually supplementarily connecting a capacitor (three-phase) to the inductances, thus resulting in individual filter stages. Depending on the manner of consideration, the filter stages should be considered as LC filter stages or else as T filters, to which a shunt branch in the form of a (three-phase) capacitor is added.

A changeover switching device 192 having two positions, as illustrated, is situated at that end of the windings which is opposite to the AC voltage side 132. In a first position, the winding ends are interconnected and form a star point 190. In a second position, different therefrom, the winding ends are separated and individually connected to the AC voltage terminal 120. A three-phase line is illustrated between the changeover switch 192 and the external AC voltage terminal 120, this being portrayed by the numeral 3 and the transverse stroke. Furthermore, the star point 190 has been led out in the illustration only for the sake of improved illustration.

Furthermore, the capacitors are connected to the windings 150a-c (via the tapping) in a delta connection. In some examples, the capacitors can also be configured in delta connections.

An electrical connection element 122 (stationary) serves for connecting the external AC voltage terminal to an AC voltage network or supply network 124, for instance in order to feed electrical energy into the supply network 124 via the converter 130 and the filter F1. The illustration furthermore shows symbolically that the external AC voltage terminal 120 and the stationary connection element 122 form a plug connection.

In some examples, an EMC filter F2 is provided, which is situated between the changeover switch 192 and the external AC voltage terminal 120. The EMC filter F2 may be configured to filter out possible high-frequency components from the power signal before the latter is fed into the network 124.

The changeover switch 192 has two positions, as illustrated, where the first position (star-point configuration) is chosen in the motor mode, and in the filter mode the ends of the winding 150a-c are separated and are connected to the external AC voltage terminal. However, the switches 160 and/or 160' are also set synchronously with the switching position of the changeover switch 192. In some examples, the disconnecting switches 160, 160' are closed if the changeover switch 192 connects the windings 150a-c to the external AC voltage terminal 120; while the disconnecting switches 160, 160' are open if the changeover switch 192 connects the winding ends (oppositely to the AC voltage side) to one another.

FIG. 1 illustrates the machine state, in which the disconnecting switches are open and the windings are connected to form the star configuration (with the star point 190). In the filter state, the states would be inverted with respect to the illustrated states, such that via the disconnecting switches 160 the capacitors 170 would be connected to the windings 150a-c and the changeover switch would connect the winding ends to the external AC terminal.

Since the switching states of the disconnecting switches 160, 160' are synchronous, or are altered synchronously, with the states of the changeover switch 192, the switches 160, 160' and 192 can be realized as a changeover switch unit having two switching states corresponding to the filter state and the machine state, respectively.

The AC/DC converter 130 has a DC voltage side 134 and is configured to convert energy between the AC voltage side 132 and the DC voltage side 134. A rechargeable vehicle battery 138 serving for example for traction and/or for supply of the electrical machine is connected to the DC voltage side 134 (if appropriate via a control module 136 or a DC/DC converter situated at this location). The electrical machine is portrayed by the windings 150a-c in FIG. 1, where the electrical machine may be an electrical machine of a vehicle that serves for traction or for instance an electrical machine of an ancillary unit, for example of an electrical air-conditioning compressor. At the location of the reference sign 136, as mentioned, a DC/DC converter can also be provided in order to compensate for differences in the operating voltage between the DC voltage side 134 and the battery 138 and/or to control the power from or to the DC/AC converter. The DC/DC converter 136 can therefore also be used for power control.

FIG. 2 shows a power circuit 210 including a DC/AC converter 230 having an AC side 232. An electrical machine 240 has windings 250a-c. The windings 250a-c are divided into sections 251 and 252, which can correspond for example to the sections A1-A3 in FIG. 1.

The windings 250a-c furthermore have tappings 255a-c. The latter are connected to capacitors 270 via capacitor disconnecting switch 260. The capacitors 270 may jointly also be regarded as a three-phase capacitor, while the disconnecting switches 260 may jointly also be regarded as a three-phase disconnecting switch.

When the disconnecting switches 260 are closed, this results in a delta configuration for the capacitors 270 connected to the tappings 255a-c. The disconnecting switches 260 are illustrated in an open state corresponding to the machine state. A changeover switch 292 is situated at that end of the windings 250a-c which is opposite to the AC voltage side 232, which changeover switch, by changeover switch elements 294a-c (which can jointly also be regarded as a three-phase changeover switch 292), connects the windings 250a-c to one another in a star configuration or does not connect the ends connected to the changeover switch 292 to one another, but rather connects them individually to an external AC voltage terminal 220.

The changeover switch 292 is illustrated in the machine state, in which the individual changeover switch elements 294a-c connect the respective winding ends to one another, in particular to the star point 290. In FIG. 2, the star point 290 is portrayed as a connection circuit in order to enable better illustration, but can also correspond to a direct connection.

The external AC voltage terminal 220 is plugged into an electrical connection element 222 (stationary) of a supply network 224.

A controller 280 controls the switching states of the disconnecting switches 260 and of the changeover switch 292, for example, in a synchronous manner. "Synchronous" here means that all the switching states are changed substantially simultaneously if a switching process occurs. The control unit 280 can furthermore have an input for receiving commands that define the state to be set. The switch 260 and the changeover switch 292 can jointly be regarded as a switching device since they switch in accordance with the same switching signals and belong together functionally, and since they constitute a filter state or a machine state.

In the power circuit 210, the signal shaping filter is formed by the sections 251 and 252 extending on both sides of the tappings 255a-c. The sections concern the windings 250a-c, where for their winding the section 251 is of the same size and the section 252 is of the same size. However, the lengths of the sections 251 may differ from the lengths of the sections 252. The two sections 251 and 252 respectively form three-phase inductances in the sense of series paths of a T filter. The three-phase capacitor of the T filter is formed by the capacitors 270, which are connected to the tappings 255a-c via the disconnecting switches 260.

Since three energy-storing components are used (i.e. inductance of the section 251, inductance of the section 252 and capacitor of the capacitors 270), this results in a third-order low-pass filter for signals that are transmitted from the AC/DC converter to the external AC voltage terminal 220. As evident from FIG. 1, the windings 250a-c may be provided with further tappings, i.e. in a second group, third group or further group of tappings, in order thus to realize further series paths of the multi-stage low-pass filter. In this case, each tapping like that illustrated in FIGS. 2 and 1 would be connected to a capacitance forming the shunt path.

A number of implementations have been described. Nevertheless, it will be understood that various modifications may be made without departing from the spirit and scope of the disclosure. Accordingly, other implementations are within the scope of the following claims.

What is claimed is:

1. A vehicle-side power circuit for supplying power in an electrically driven vehicle, the vehicle-side power circuit comprises:
    an external AC voltage terminal;
    at least one DC/AC converter having an AC voltage side;
    an electrical machine having a plurality of windings, each of which has a first tapping, the electrical machine is connected to the AC voltage side of the DC/AC converter;
    a switching device connected to the plurality of windings; and
    a signal shaping filter having a plurality of first capacitors, the signal shaping filter is connected between the DC/AC converter and an external AC terminal, the switching device configured to separately perform each of:
        interconnect the windings within the electrical machine; and
        connect the first tappings of the plurality of windings within the signal shaping filter to the plurality of first capacitors to form an at least third-order low-pass filter,
    wherein each first capacitor has a capacitor disconnecting switch of the switching device, via which the first capacitor is connected to the relevant first tapping.

2. The vehicle-side power circuit of claim 1, furthermore comprising second or further capacitors connected to second or further tappings of the windings in a switchable manner.

3. The vehicle-side power circuit of claim 1, wherein the first tappings subdivide the windings into sections having different inductances.

4. The vehicle-side power circuit of claim 1, wherein the signal shaping filter filters a signal having a fundamental power proportion of at least 75%, 85%, 95% or 98% of the total power from a rectangular wave having a fundamental frequency of 40 Hz-400 Hz and a duty ratio of 50%.

5. The vehicle-side power circuit of claim 1, wherein the DC/AC converter is bidirectional.

6. The vehicle-side power circuit of claim 1, wherein the power circuit includes a star-point disconnecting device having star-point switching devices, wherein via the star-point disconnecting device ends of the windings of the electrical machine are connected to one another in a switchable manner to form a star point.

7. The vehicle-side power circuit of claim 6, furthermore comprising a control unit configured to put the switching device and star-point disconnecting device into a filter state and a machine state, wherein:
    in the filter state, the control unit drives the star-point disconnecting device in accordance with an open switching state and drives the switching device in accordance with a closed switching state, such that the windings are connected to the capacitors to form the at least third-order low-pass filter; and
    in the machine state the control unit drives the star-point disconnecting device in accordance with a closed switching state and drives the switching device in accordance with an open switching state, such that the windings are connected to form a three-phase stator winding.

8. The vehicle-side power circuit of claim 1, further comprising an EMC filter connected upstream of the external AC voltage terminal a cutoff-frequency of said EMC filter lying above a cut-off frequency of the signal shaping filter.

9. The vehicle-side power circuit of claim 1, wherein the external AC terminal is designed according to the IEC 62196 standard.

10. A vehicle-side power circuit for supplying power in an electrically driven vehicle, the vehicle-side power circuit comprises:
    an external AC voltage terminal;
    at least one DC/AC converter having an AC voltage side;
    an electrical machine having a plurality of windings, each of which has a first tapping, the electrical machine is connected to the AC voltage side of the DC/AC converter;
    a switching device connected to the plurality of windings;
    a signal shaping filter having a plurality of first capacitors, the signal shaping filter is connected between the DC/AC converter and an external AC terminal, the switching device configured to separately perform each of:
        interconnect the windings within the electrical machine; and
    connect the first tappings of the plurality of windings within the signal shaping filter to the plurality of first capacitors to form an at least third-order low-pass filter,
        second or further capacitors connected to second or further tappings of the windings in a switchable manner,
    wherein the second or further tappings are located on the same windings as the windings on which the first tappings are located and spaced therefrom.

11. The vehicle-side power circuit of claim 1, wherein when the switching device is configured to connect the first tappings to the plurality of first capacitors, the first capacitors are connected in a delta configuration to the windings.

12. The vehicle-side power circuit of claim 1, wherein the electrical machine comprises a motor.

13. A vehicle-side power circuit for supplying power in an electrically driven vehicle, the vehicle-side power circuit comprises:
    an external AC voltage terminal;
    at least one DC/AC converter having an AC voltage side;

an electrical machine having a plurality of windings, each of which has a first tapping, the electrical machine is connected to the AC voltage side of the DC/AC converter;

a switching device connected to the plurality of windings;

a signal shaping filter having a plurality of first capacitors, the signal shaping filter is connected between the DC/AC converter and an external AC terminal, the switching device configured to separately perform each of:

interconnect the windings within the electrical machine; and connect the first tappings of the plurality of windings within the signal shaping filter to the plurality of first capacitors to form an at least third-order low-pass filter, and one or more second capacitors connected to second tappings of the windings via the switching device, the second tappings being spaced apart from the first tappings on the windings.

* * * * *